United States Patent
Anstey et al.

(10) Patent No.: US 6,639,900 B1
(45) Date of Patent: Oct. 28, 2003

(54) USE OF GENERIC CLASSIFIERS TO DETERMINE PHYSICAL TOPOLOGY IN HETEROGENEOUS NETWORKING ENVIRONMENTS

(75) Inventors: Kathy Alice Anstey, Cary, NC (US); Franck Barillaud, Austin, TX (US); Allen Jackson Croft, Jr., Durham, NC (US); John Ferguson Linton, Raleigh, NC (US); Demetrios James Marinos, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,181

(22) Filed: Dec. 15, 1999

(51) Int. Cl.$^7$ ............................................. H04L 12/28
(52) U.S. Cl. ........................ 370/254; 370/255; 706/15
(58) Field of Search ................. 370/252, 253, 370/254, 255, 464, 465, 466, 467, 468, 401, 402, 410; 706/15, 16, 25; 709/235, 223, 209; 455/676

(56) References Cited

U.S. PATENT DOCUMENTS

| | | | |
|---|---|---|---|
| 5,606,664 A | 2/1997 | Brown et al. ............. 395/200.1 |
| 5,684,796 A | 11/1997 | Abidi et al. ................. 370/389 |
| 5,710,885 A | 1/1998 | Bondi .................... 395/200.54 |
| 5,727,157 A | 3/1998 | Orr et al. ................ 395/200.54 |
| 5,751,964 A | 5/1998 | Ordanic et al. ......... 395/200.54 |
| 5,822,535 A | 10/1998 | Takase et al. ........... 395/200.56 |
| 5,845,277 A | 12/1998 | Pfeil et al. ...................... 707/3 |
| 5,848,243 A | 12/1998 | Kulkarni et al. ........ 395/200.54 |
| 5,864,862 A | 1/1999 | Kriens et al. ................ 707/103 |
| 5,926,463 A | * 7/1999 | Ahearn ........................ 370/254 |
| 6,119,235 A | * 9/2000 | Vaid ............................ 713/201 |
| 6,125,105 A | * 9/2000 | Edwards ..................... 370/230 |
| 6,209,033 B1 | * 3/2001 | Datta .......................... 709/224 |
| 6,216,163 B1 | * 4/2001 | Bharali ....................... 709/227 |
| 6,260,072 B1 | * 7/2001 | Rodriguez-Moral ........ 709/241 |
| 6,542,468 B1 | * 4/2003 | Hatakeyama ............... 370/238 |

OTHER PUBLICATIONS

James W. Hong, Michael A. Bauer and J. Michael Bennett, *The Role of Directory Services in Network Management*, Sep. 28, 1992, pp. 175–187.

Chung Sheng Li, Yoram Ofek and Moti Yung, "*Time–Driven Priority*" *Flow Control for Real–Time Heterogeneous Internetworking*, Aug. 3, 1995.

U.S. patent application Ser. No. 09/465,182, Barillaud, filed Dec. 15, 1999.

U.S. patent application Ser. No. 09/465,183, Barillaud, filed Dec. 15,1999.

* cited by examiner

*Primary Examiner*—Douglas Olms
*Assistant Examiner*—Ricardo M. Pizarro
(74) *Attorney, Agent, or Firm*—Marilyn Smith Dawkins; Bracewell & Patterson, L.L.P.

(57) ABSTRACT

Round trip time, bottleneck link speed, and hop count information from one node to the remaining nodes within a network is collected and processed by an adaptive resonance theory (ART) neural network to classify the nodes by physical location or site group. For each site group, round trip time from one node to the remaining nodes is then collected and processed utilizing an ART neural network to classify the nodes into one or more physical groups. The resulting breakdown of site groups within the network and physical groups within the site groups forms a model which may be employed by networking and system management applications. No private or proprietary vendor specific information from communications devices within the network need be employed to develop the model, only publicly available information regarding communications parameters.

21 Claims, 4 Drawing Sheets

USE OF GENERIC CLASSIFIERS TO DETERMINE PHYSICAL TOPOLOGY IN HETEROGENEOUS NETWORKING ENVIRONMENTS

RELATED APPLICATIONS

The present invention is related to the subject matter of commonly assigned, copending U.S. patent applications: Ser. No. 09/465,182 entitled "USE OF ADAPTIVE RESONANCE THEORY (ART) NEURAL NETWORKS TO COMPUTE BOTTLENECK LINK SPEED IN HETEROGENEOUS NETWORKING ENVIRONMENTS"; and Ser. No. 09/465,184 entitled "USE OF ADAPTIVE RESONANCE THEORY TO DIFFERENTIATE NETWORK DEVICE TYPES (ROUTERS VS. SWITCHES)". The content of the above-identified applications are incorporated herein by reference.

BACKGROUND OF THE INVENTION

1. Technical Field

The present invention generally relates to determining physical network topology of heterogeneous networks and in particular to determining physical network topology without employing vendor-dependent information for network devices. Still more particularly, the present invention relates to employing neural networks to generically classify and physically group network devices based on communications parameters from a selected network device including round trip time, bottleneck link speed and hop count.

2. Description of the Related Art

Computer networks are essential features of contemporary computing, providing the framework for exchange of data and execution of distributed applications, either through client-server interaction such as HyperText Transmission Protocol clients and servers or collaborative operation such as failover redundancy in highly available networks. In order to efficiently perform tasks, most networking and system management applications today require a knowledge of the underlying physical network topology. However, existing topology applications provide, at best, only an approximation of the actual physical topology.

A variety of different reasons contribute to the use of approximations for network physical topologies in contemporary applications. The primary reason, however, is that a substantial number of network devices (e.g., network interface cards or adapters) do not implement any functions or variables which would allow those network devices to be "discovered" or automatically identified and/or classified by a topology application. Even when functions or variables are implemented by a network device to provide information to topology applications, the information is provided in a manufacturer-dependent, and often private, manner.

Currently, the most common technique utilized by topology applications to discover physical topology involves extracting topology information from each individual network device within the network utilizing the Simple Network Management Protocol (SNMP). This is not a simple task because, as noted above, no standard exists across different manufacturers or vendors for organizing or classifying physical network topology information. For example, Cisco Systems may employ a particular data structure to describe the connection to their devices while 3COM Corporation employs an entirely different data structure, which may or may not include all of the same variables as the Cisco data structure, to describe their connection.

It would be desirable, therefore, to be able to determine physical network topology without knowing or utilizing any vendor-specific information. It would further be advantageous to employ physical topology information which relies only on information which is readily available within any heterogeneous network.

SUMMARY OF THE INVENTION

It is therefore one object of the present invention to provide an improved method, apparatus, and computer program product for determining physical network topology of heterogeneous networks.

It is another object of the present invention to provide a method, apparatus, and computer program product for determining physical network topology without employing vendor-dependent information for network devices.

It is yet another object of the present invention to employ neural networks to generically classify and physically group network devices based on communications parameters from a selected network device including round trip time, bottleneck link speed and hop count.

The foregoing objects are achieved as is now described. Round trip time, bottleneck link speed, and hop count information from one node to the remaining nodes within a network is collected and processed by an adaptive resonance theory (ART) neural network to classify the nodes by physical location or site group. For each site group, round trip time from one node to the remaining nodes is then collected and processed utilizing an ART neural network to classify the nodes into one or more physical groups. The resulting breakdown of site groups within the network and physical groups within the site groups forms a model which may be employed by networking and system management applications. No private or proprietary vendor specific information from communications devices within the network need be employed to develop the model, only publicly available information regarding communications parameters.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
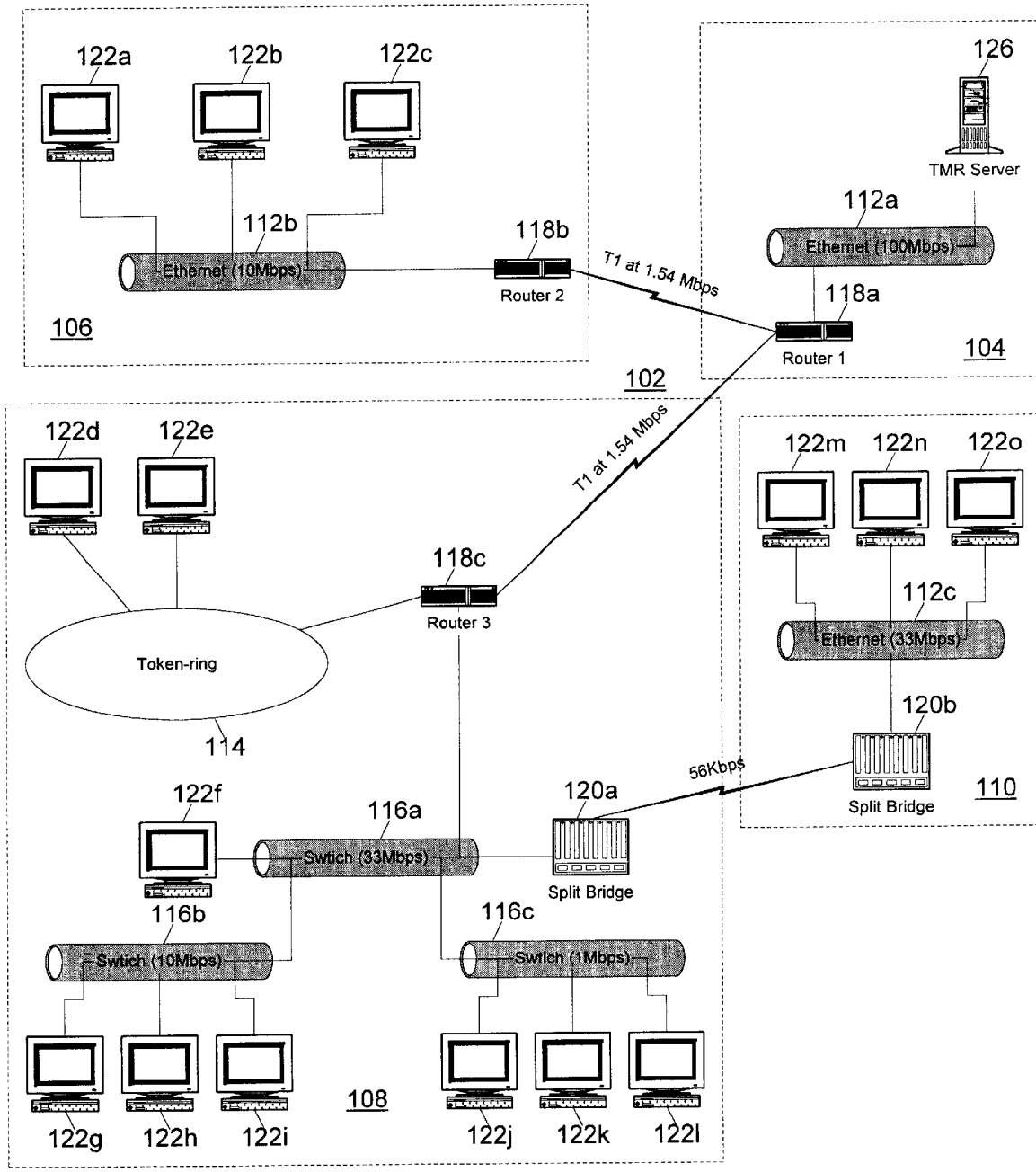
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 is a wide area network (WAN) or global area network (GAN) including a number of constituent local area networks (LANs) 104, 106, 108, and 110. In the exemplary embodiment, LAN 104 is located, for example, in Dallas, Tex., LAN 106 is located in Austin, Tex., LAN 108 is located in Raleigh, N.C. and LAN 110 is located in Durham, N.C.

Data processing system network 102 is heterogenous, meaning that each component network 104, 106, 108, and 110 may employ a different "backbone" or communications protocol, and that communications between component networks 104, 106, 108, and 110 may utilize different forms and devices. In the exemplary embodiment, for instance, LANs 104, 106, and 110 each employ an Ethernet backbone 112a–112c, although with differing maximum data throughput rates, while LAN 108 employs both token ring and switched communications protocols 114 and 116a–116c, respectively. Additionally, LAN 104 communicates with LANs 106 and 108 utilizing routers 118a–118c, while LAN 108 communicates with LAN 110 utilizing a split bridge 120a–120b.

Executing within each of the data processing systems 122a through 122o in data processing system network 102 may be a distributed computing environment and/or application (not shown), such as Tivoli Global Enterprise Manager (GEM) available from Tivoli Systems (www.tivoli.com). Such a distributed computing environment or application may provide enterprise asset management, network change (e.g., software updates) management, operations management, security and storage management, etc. A distributed computing environment and/or application of the type described requires access to information regarding the underlying physical network topology in order to perform tasks in an efficient manner.

In order to determine physical network topology is information for the benefit of a distributed computing environment or application without utilizing any knowledge of specific vendor-dependent information regarding the network devices, the present invention collects communication timing information. Among the communication timing information which is collected is: the round trip time, or the mean communication time from one network node to another network node; the hop count, or the number of networking routing devices between two nodes; and the bottleneck link speed, which is the lowest link speed between two nodes. All of this information may be collected without employing any private or vendor-specific information regarding the devices within the network.

In the exemplary embodiment, measurement of communication parameters is keyed on server 126 and workstations 122a–122o. Server 126 is selected and the communications parameters of round trip time, bottleneck link speed, and hop count are measured from server 126 to each of the workstations 122a–122o. Server 126 is located within LAN 104 in Dallas, workstations 122a–122c are located within LAN 106 in Austin, workstations 122d–122l are located within LAN 108 in Raleigh, and workstations 122m–122o are located within LAN 110 in Durham. The hop count between server 126 and each of workstations 122a–122l in the exemplary embodiment happens to be identical: two. The hop count between server 126 and each of workstations 122m–122o in the exemplary embodiment is four. The round trip time (RTT) and bottleneck link speed (BLS) are measured from a selected source to each target network node or device, so that the ability to group resources based on these parameters depends on two critical factors: propagation delay, or the time it takes for a signal to travel across a media connecting source and target devices, which in the case of high speed LAN connections transmitting large data packets is almost negligible; and transmission delay, or the rate at which bits may be successfully transferred to and from the network interface to and from the transmission media, which is packet-size dependent. For the link sizes and types depicted in the exemplary embodiment, sample values are listed in Table I below:

TABLE I

| Source to Target | Distance (miles) | Connection Speed | Propagation Delay (microseconds) | Transmission Time (microseconds) Min (64 Bytes) | Transmission Time (microseconds) Max (1500 Bytes) |
| --- | --- | --- | --- | --- | --- |
| Dallas to Austin | 183 | 1.54 Mbps | 984 | 332.5 | 7,792.2 |
| Dallas to Raleigh | 1062 | 1.54 Mbps | 5,709 | 332.5 | 7,792.2 |
| Raleigh to Durham | 5 | 56 Kbps | 27 | 9,142.9 | 214,285.7 |

Example communication parameter measurements from server 126 to workstations 124a–124l for the network configuration depicted are listed in Table II.

TABLE II

| Source/Target | RTT | BLS |
| --- | --- | --- |
| Server to Austin Workstations | 2,757 | 1.54 Mbps |
| Server to Raleigh TR Workstations | 6,084 | 1.54 Mbps |
| Server to Raleigh Switch Workstations | 6,053 | 1.54 Mbps |
| Raleigh TR to Raleigh Switch | 96 | 16 Mbps |

The round trip time, bottleneck link speed, and hop count information may be determined from information about the network nodes usually discovered and stored in a database by a network management application. In transmission control protocol/Internet Protocol (TCP/IP) architectures, round trip time and bottleneck link speed are typically measured by sending a sequence of ICMP ECHO packets from the source to the target and measuring the inter-arrival times of the returning packets.

Figure 2:
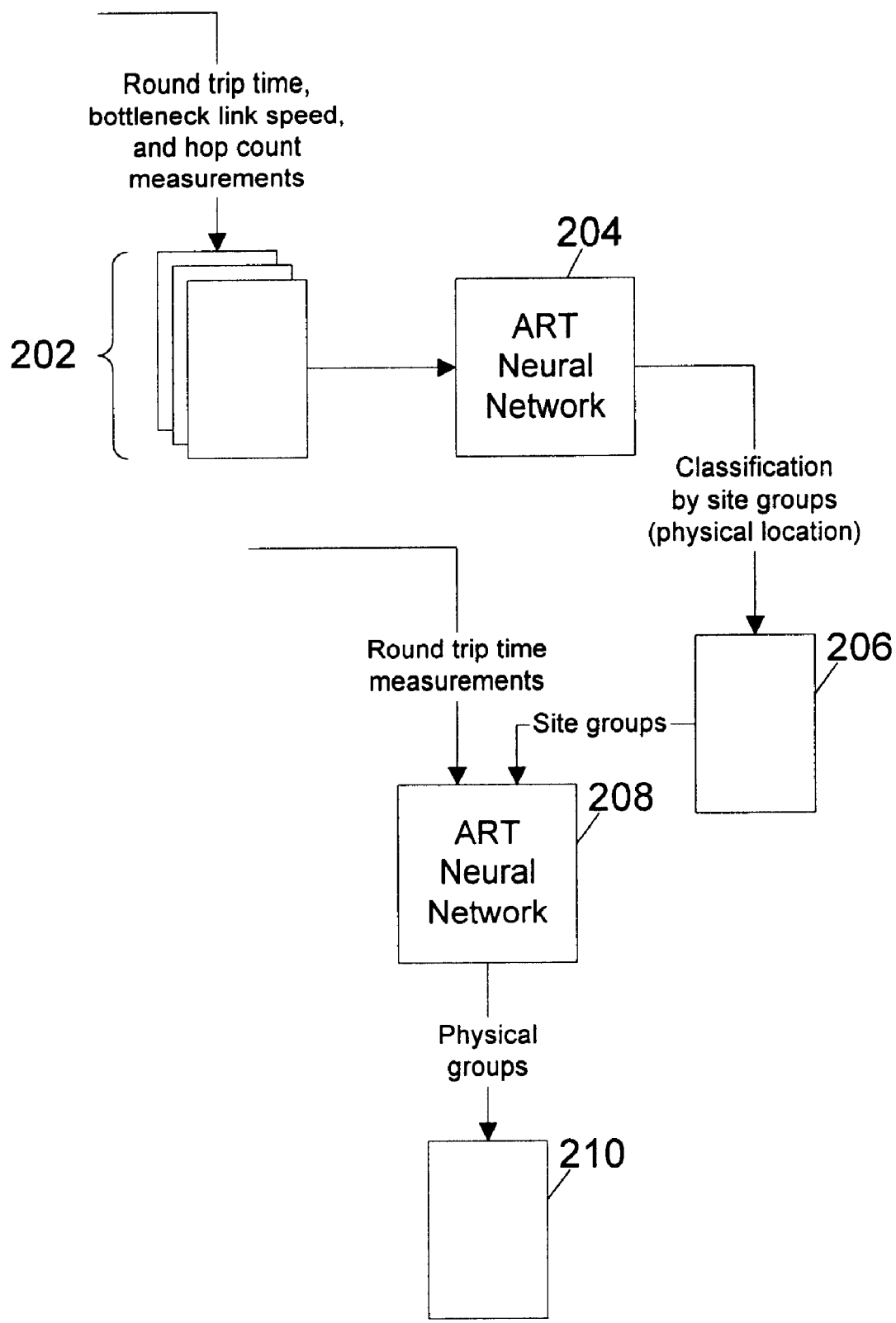
FIG. 2 is a data flow diagram for processing of measured communications parameters to classify and physically group network devices in accordance with a preferred embodiment of the present invention.

Referring now to FIG. 2, a data flow diagram for processing of measured communications parameters to classify and physically group network devices in accordance with a preferred embodiment of the present invention is illustrated. Communications parameter measurements 202 are collected between a selected source and all possible target network devices as described above. These round trip time, bottleneck link speed, and hop count measurements are then analyzed to group the network devices by site location (physical groups). Rather than utilizing statistical methods to analyze the information, however, a generic classifier such as a neural network is employed, preferably an adaptive resonance theory (ART) neural network 204. A Self Organizing Feature Map (SOFM) neural network may alternatively be employed.

ART neural networks are known in the art and available from several sources. ART neural networks are defined algorithmically in terms of detailed differential equations intended as plausible models of biological neurons. In practice, ART neural networks are implemented using analytical solutions or approximations to the differential equations. ART neural networks may be supervised or unsupervised, where unsupervised ART neural networks are basically similar to many iterative clustering algorithms in which each case is processed by finding the "nearest" cluster seed (i.e., prototype or template) to that case, then updating that cluster seed to be "closer" to the subject case, where "nearest" and "closer" may be defined in a variety of different manners.

In ART neural networks, however, this framework is slightly modified by introducing the concept of "resonance", so that each case is processed by finding the "nearest" cluster seed which "resonates" with that case, then updating that cluster seed to be "closer" to the subject case. The term "resonance" refers to the so called resonant state of the neural network in which a category prototype vector matches the current input vector close enough so the orienting subsystem will not generate a reset signal. In this case, the activity pattern causes the same node to be selected, which in turn sends the same prototype vector, which again matches the current input close enough, and so on. The neural network learns only in its resonant state. ART neural networks are capable of developing stable clusterings of arbitrary sequences of input patterns by self-organization. In general, the output of an ART neural is network would be of the form:

| Node | Class |
|------|-------|
| A | 1 |
| B | 1 |
| C | 2 |
| D | 2 |
| E | 3 |
| F | 1 |
| G | 3 |
| H | 4 |

These results indicate that nodes A, B and F belong to the same class, nodes C and D belong to a different class, and nodes E and G belong to a third class, while node H belongs to its own class. With the context of the present invention, the different classes may be interpreted as representing distinct site groups (physical locations) or different physical groups, as described in greater detail below.

Use of a neural network is not critical to the approach of the present invention in determining physical network topology. When a neural network is employed for classification of nodes based on communications parameters rather than statistical methods, however, less computation resources are required. Moreover, neural networks correlating the data may "discover" rules which could not be determined utilizing statistical methods, such as correlation of both round trip time and bottleneck link speed for all network nodes connected to a single local area network.

In the present invention, an ART neural network 204 produces site groupings 206 of the network devices based on round trip time, bottleneck link speed, and hop count measurements. ART neural network 204 speeds up the analysis of such communications parameters over statistical methods without the need to rely on access to vendor specific information. The physical location or site groupings 206 for the exemplary embodiment described above in connection with FIG. 1 would result in the following determinations:

Server 126 is a different site from all workstations because all round trip times indicate a long propagation time;

Workstations 122a–122c are in a different site that all other workstations because there are no other workstations with a sufficiently close round trip time; and Workstations 122d–122e and 122f–122l may be in the same site or in sites at similar distances. The measurement of the round trip time between workstations 122d–122e and 122f–122l provides a value indicating that all workstations are in the same site.

These site location clusterings by ART neural network 204 represent the first level of the physical topology determination.

Once the site location "clustering" or site groups 206 have been determined by ART neural network 204, the round trip time measurements from the measured communications parameters 202 are reused or, preferably, new round trip time measurements within a site group (from one node within a given site group to all other nodes within the site group) are made. This round trip time information is analyzed by another ART neural network 208, which processes the timing information in each site to determine the physical groups, which represents a group of network devices (e.g., workstations) sharing the same physical characteristics. Separate physical groups within a site location may be inferred from disparate round trip times reflecting a bottleneck link speed differential (latency introduced by a network communications device). The physical group level is a sufficient granularity for use by a distributed computing application. The output of ART neural network 208 is therefore a model of the physical network topology which may be utilized by distributed computing environments and/or applications.

Figure 3:
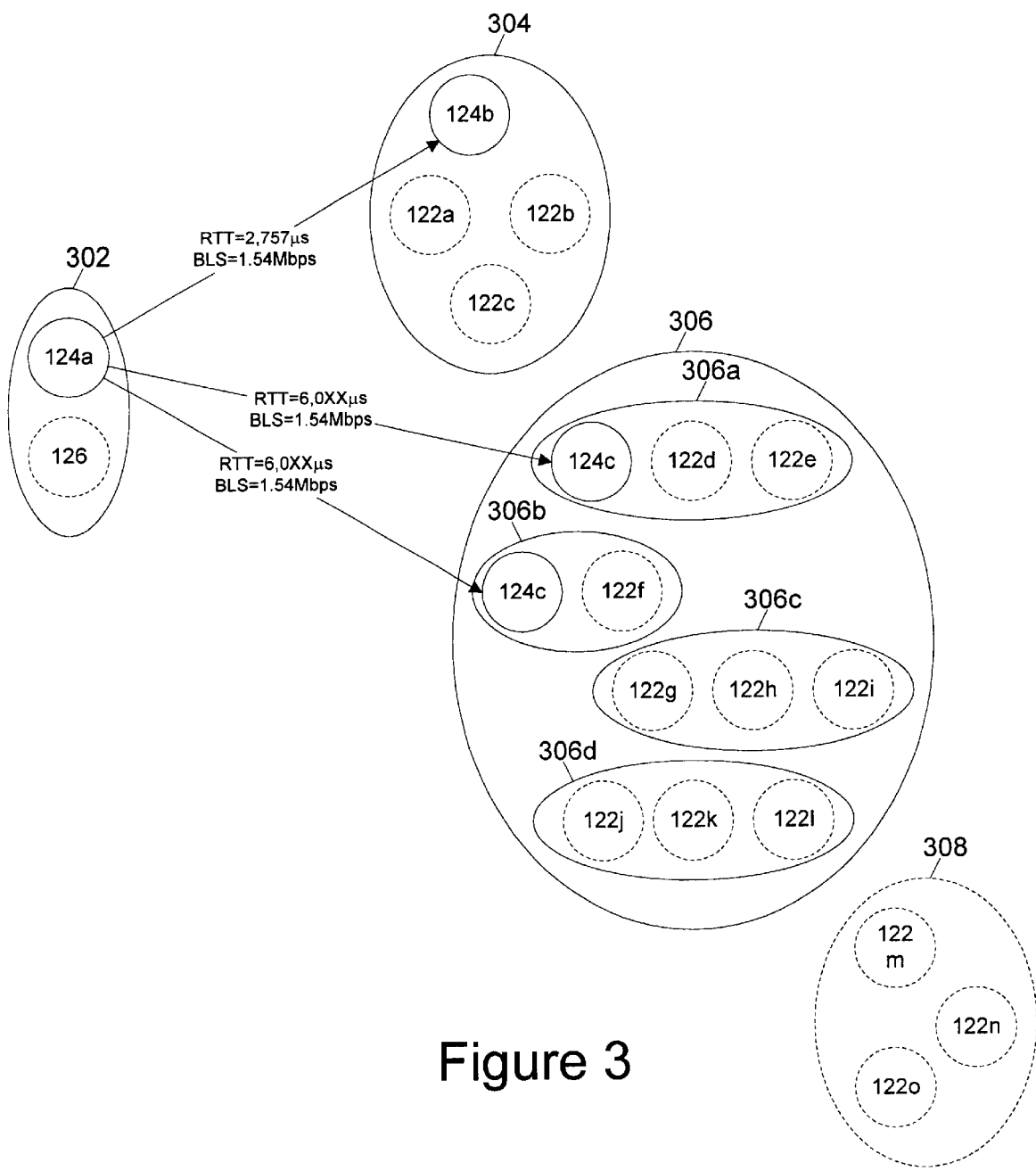
FIG. 3 depicts a diagram of a physical network topology model determined by analysis of communications parameters in accordance with a preferred embodiment of the present invention.

With reference now to FIG. 3, a diagram of a physical network topology model determined by analysis of communications parameters in accordance with a preferred embodiment of the present invention is depicted. The model depicted relates to the exemplary data processing system network 102 of FIG. 1, determined by processing communications parameters as described above in connection with FIGS. 1 and 2. As mentioned earlier, based on the round trip time, bottleneck link speed, and hop count measurements, an ART neural network will determine that Server 126 is in a different site group 302 than all other repeaters because all round trip times indicate a long propagation time.

Workstations 122a–122c are determined to be in a different site group 304 than workstations 122d–122e and workstations 122f–122l because neither workstations 122d–122e nor workstations 122f–122l has a round trip time from server 126 which is close to the round trip time from server 126 to workstations 122a–122c. Workstations 122d–122e and workstations 122f–122l, which have similar round trip times from server 126, may be either in the same site or in different sites located similar distances from server 126. Measurement of the round trip time between workstations 122d–122e and workstations 122f–122l indicates that the two are located in the same site group 306.

In practice, the round trip time, bottleneck link speed, and hop count communications parameter measurements are taken for all network nodes or devices of interest (i.e., workstations 122a–22o) and process by an ART neural network in the manner described above. The measurement and processing may be performed by a server (e.g., server 126 depicted in FIG. 1) which is intended to host the distributed application environment and/or application which will-rely upon the physical network topology information developed.

Upon measurement and analysis of the communications parameters for all workstations 122a–122o, the physical its network topology model would include a fourth site group 308. Furthermore, within site group 306, workstations 122d–122e will be determined to a different physical group 306a than workstations 122f–122l (physical group 306b). Workstations 122g–122i and 122j–122l will also be determined to belong to distinct physical groups 306c and 306d, respectively, within site group 306.

Figure 4:
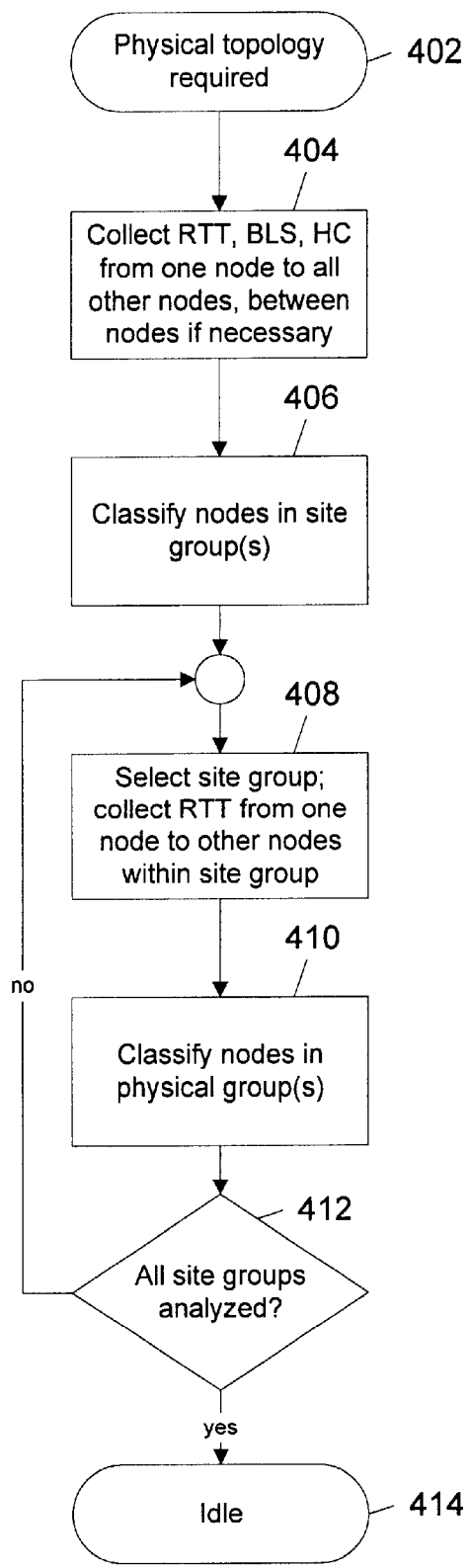
FIG. 4 is a high level flow chart for a process of determining physical network topology without reference to vendor dependent information in accordance with a preferred embodiment of the present invention.

Referring to FIG. 4, a high level flow chart for a process of determining physical network topology without reference to vendor dependent information in accordance with a preferred embodiment of the present invention is illustrated. The process begins at step 402, which depicts a need for information regarding the physical topology of a network arising. The process first passes to step 404, which illustrates round trip time (RTT), bottleneck link speed (BLS), and hop count (HC) information from one node in the network to all other nodes within the network, and between nodes, as necessary. The process next passes to step 406, which depicts classifying the nodes in one or more site groups based on the round trip time, bottleneck link speed, and hop count information utilizing an ART neural network.

The process passes next to step 408, which illustrates selecting a site group and collecting round trip time information for nodes within that site group, from one node to all other nodes. The process then passes to step 410, which depicts classifying the nodes within the site group into one or more physical groups based on the round trip time information utilizing an ART neural network. The process next passes to step 412, which illustrates a determination of whether all site groups have been analyzed. If not, the process returns to step 408 to select and analyze another site group. If so, however, the process proceeds instead to step 414, which illustrates the process becoming idle until another network topology is required.

The problem of making physical topology determinations has only been partially solved by prior techniques. Most existing network management applications dealing with physical topology attempt to identify each networking device (i.e., router, switch, bridge, etc.) linking the network (or subnetworks) together, and obtain physical information regarding how that networking device is connected to other nodes by accessing the internal databases of the networking device. Because the vendors for such devices do not always implement such information in an accessible manner, however, the physical topology is difficult to extract in this manner. When network devices do not contain any topology information, the application must make assumptions to attempt to determine how the physical topology looks, a process which consumes a great deal of computational resources. The present invention provides a usable model of the physical topology in a faster time, using less computational resources.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of determining a physical topology of a network, comprising:

from a selected network node, determining values of communications parameters including round trip time, bottleneck link speed, and hop count to each of a plurality of other network nodes;

utilizing the communications parameters, classifying the selected network node and the plurality of other network nodes into one or more site groups; and utilizing round trip time values, classifying each network node within a site group into one or more physical groups.

2. The method of claim 1, further comprising:

for each site group, selecting a node within the site group and, from the selected node within the site group, determining round trip time values for each other node within the site group.

3. The method of claim 2, wherein the step of classifying each network node within a site group into one or more physical groups further comprises:

employing an adaptive resonance theory neural network to classify the selected network node and the plurality of other network nodes.

4. The method of claim 3, wherein the step of classifying the selected network node and the plurality of other network nodes into one or more site groups further comprises:

employing an adaptive resonance theory neural network to classify the network nodes within the site group.

5. The method of claim 4, wherein the step of classifying each network node within a site group into one or more physical groups further comprises:

selecting a site group from the one or more site groups; and determining round trip time values from a first node within the selected site group to each other node within the site group.

6. The method of claim 5, wherein the step of classifying the selected network node and the plurality of other network nodes into one or more site groups further comprises:

responsive to identifying two or more nodes within the plurality of other network nodes which may belong to a single site group or which may belong to distinct, similar site groups, determining a round trip time between the two nodes and determining, from the round trip time between the two nodes, whether the two nodes belong to a single site group or belong to distinct, similar site groups.

7. The method of claim 6, further comprising:

employing the one or more site groups and any physical groups within the one or more site groups as a representation of the physical topology of the network.

8. A system for determining a physical topology of a network, comprising:

a plurality of nodes within the network;

means for determining, from a selected network node, values of communications parameters including round trip time, bottleneck link speed, and hop count to each of a plurality of other network nodes;

means for classifying the selected network node and the plurality of other network nodes into one or more site groups utilizing the communications parameters; and means for classifying each network node within a site group into one or more physical groups utilizing round trip time values.

9. The system of claim 8, further comprising:

means for selecting, for each site group, a node within the site group and, from the selected node within the site group, determining round trip time values for each other node within the site group.

10. The system of claim 9, wherein the means for classifying each network node within a site group into one or more physical groups further comprises:

an adaptive resonance theory neural network.

11. The system of claim 10, wherein the means for classifying the selected network node and the plurality of other network nodes into one or more site groups further comprises:

an adaptive resonance theory neural network.

12. The system of claim 11, wherein the means for classifying each network node within a site group into one or more physical groups further comprises:

means for selecting a site group from the one or more site groups; and means for determining round trip time values from a first node within the selected site group to each other node within the site group.

13. The system of claim 12, wherein the means for classifying the selected network node and the plurality of other network nodes into one or more site groups further comprises:

means, responsive to identifying two or more nodes within the plurality of other network nodes which may belong to a single site group or which may belong to distinct, similar site groups, for determining a round trip time between the two nodes and for determining, from the round trip time between the two nodes, whether the two nodes belong to a single site group or belong to distinct, similar site groups.

14. The system of claim 13, further comprising:

means for employing the one or more site groups and any physical groups within the one or more site groups as a representation of the physical topology of the network.

15. A computer program product within a computer usable medium for determining a physical topology of a network, comprising:

instructions for determining, from a selected network node, values of communications parameters including round trip time, bottleneck link speed, and hop count to each of a plurality of other network nodes;

instructions for classifying the selected network node and the plurality of other network nodes into one or more site groups utilizing the communications parameters; and instructions for classifying each network node within a site group into one or more physical groups utilizing round trip time values.

16. The computer program product of claim 15, further comprising:

instructions for selecting, for each site group, a node within the site group and, from the selected node within the site group, determining round trip time values for each other node within the site group.

17. The computer program product of claim 16, wherein the instructions for classifying each network node within a site group into one or more physical groups further comprise:

instructions for employing an adaptive resonance theory neural network to classify each network node within a site group into one or more physical groups.

18. The computer program product of claim 17, wherein the instructions for classifying the selected network node and the plurality of other network nodes into one or more site groups further comprise:

instructions for employing an adaptive resonance theory neural network to classify the selected network node and the plurality of other network nodes into one or more site groups.

19. The computer program product of claim 18, wherein the instructions for classifying each network node within a site group into one or more physical groups further comprise:

instructions for selecting a site group from the one or more site groups; and instructions for determining round trip time values from a first node within the selected site group to each other node within the site group.

20. The computer program product of claim 19, wherein the instructions for classifying the selected network node and the plurality of other network nodes into one or more site groups further comprise:

instructions, responsive to identifying two or more nodes within the plurality of other network nodes which may belong to a single site group or which may belong to distinct, similar site groups, for determining a round trip time between the two nodes and for determining, from the round trip time between the two nodes, whether the two nodes belong to a single site group.

21. The computer program product of claim 20, further comprising:

instructions for employing the one or more site groups and any physical groups within the one or more site groups as a representation of the physical topology of the network.

* * * * *